Oct. 6, 1970 J. E. JENNINGS 3,532,908

TUNABLE BANDPASS ACTIVE FILTER

Original Filed Sept. 15, 1966

INVENTORS
James E. Jennings
Lester H. Kosowsky
BY
Shenier & O'Connor
ATTORNEYS

United States Patent Office 3,532,908
Patented Oct. 6, 1970

3,532,908

TUNABLE BANDPASS ACTIVE FILTER

James E. Jennings and Lester H. Kosowsky, Norwalk, Conn., assignors to United Aircraft Corporation, East Hartford, Conn., a corporation of Delaware Continuation of application Ser. No. 579,752, Sept. 15, 1966. This application Oct. 15, 1969, Ser. No. 866,768
Int. Cl. H03h 7/10
U.S. Cl. 307—295 10 Claims

ABSTRACT OF THE DISCLOSURE

A tunable bandpass active filter, the resistive components of which are provided by diodes, the adjustable bias current through which determines the center frequency of the filter characteristic. We provide our filter with an adjustable regenerative feedback signal, the magnitude of which can be varied to adjust the sharpness of response of the circuit.

This application is a continuation of application Ser. No. 579,752 filed Sept. 15, 1966, now abandoned.

BACKGROUND OF THE INVENTION

The frequency to which a resistance-capacitive circuit is tuned is inversely proportional both to the resistance and to the capacitance making up the circuit. It will readily be seen that in the mid and low frequency ranges either a high resistance or a high capacitance, or both a high resistance and a high capacitance, are required to tune such a circuit. This requirement does not present a serious problem in conventional circuits since high impedance values can be provided merely by substituting components in the circuit. While the problem is not a serious one in conventional circuits, it is serious in the art of solid microcircuitry. In such circuitry the area required to provide either a resistor of high value or a capacitor of high value is of such inordinate size, if the desired frequency response is to be provided, as to make the device impracticable.

We have invented a tunable bandpass active filter which overcomes the problems of the prior art pointed out hereinabove. Our tunable bandpass active filter is especially adapted for use in solid microcircuitry. We provide a tunable bandpass active filter which does not require excessively large areas of a circuit chip to provide the required circuit parameters at low frequencies. We can readily adjust the center frequency of our circuit over a relatively wide range of frequencies. We may also adjust the sharpness of tuning of our circuit with ease.

DESCRIPTION OF THE INVENTION

One object of our invention is to provide a tunable bandpass active filter which overcomes the problems of the prior art.

Another object of our invention is to provide a tunable bandpass active filter which is especially adapted for use in solid microcircuits.

A further object of our invention is to provide a tunable bandpass active filter which is especially adapted for use in the mid and low frequency ranges.

A still further object of our invention is to provide a tunable bandpass active filter, the center frequency of which can readily be adjusted.

Yet another object of our invention is to provide a tunable bandpass active filter, the sharpness of tuning of which can readily be adjusted.

Other and further objects of our invention will appear from the following description.

In the accompanying drawings which form part of the instant specification and which are to be read in conjunction therewith and in which like reference numerals are used to indicate like parts in the various views.

Figure 1:
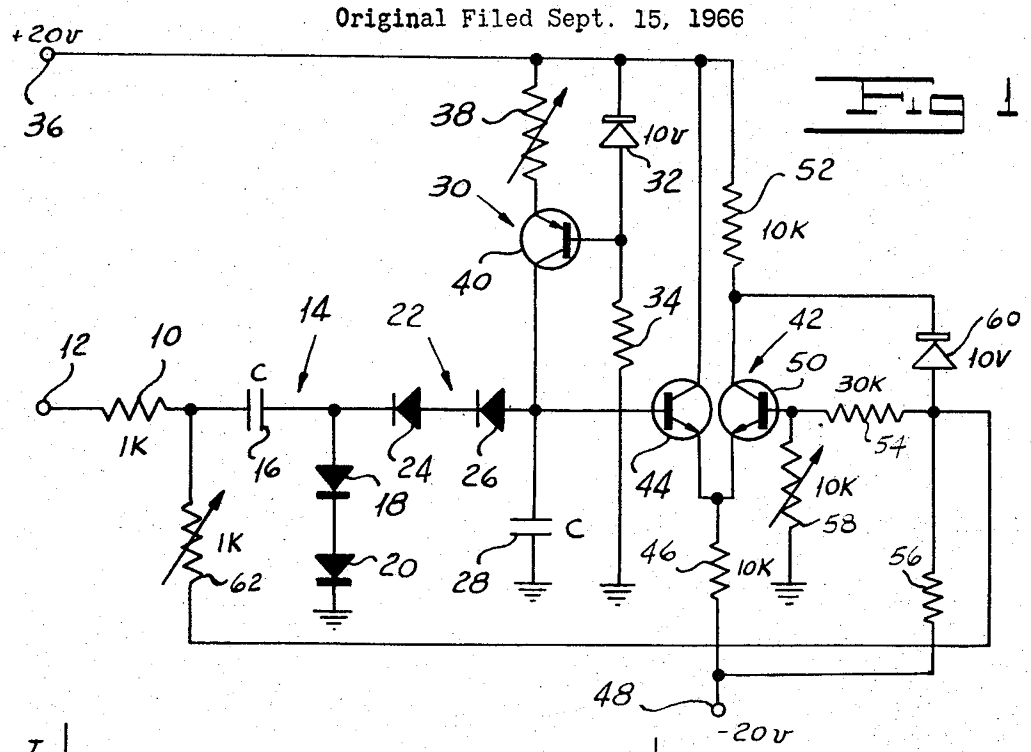
FIG. 1 is a schematic view of one form of our tunable bandpass active filter.

Referring now to the drawings, our tunable bandpass active filter includes a resistor 10 which couples an input terminal 12 to a high-pass filter section indicated generally by the reference character 14 of our filter. The filter section 14 includes a series capacitor 16 and a string of shunt diodes which may include any required number to provide the desired characteristic. By way of example, we have shown two diodes 18 and 20 as making up the string of diodes of the filter section 14.

Following the high-pass filter section 14, we provide a low-pass filter section indicated generally by the reference character 22. The section 22 includes a string of series-connected diodes of any number required to provide the desired characteristic. Again by way of example, the string of diodes of the section 22 may include two diodes 24 and 26. The low-pass section 22 also includes a shunt capacitor 28 which, for purposes of convenience in exposition, we have selected to have the same capacitance value as does capacitor 16.

As has been pointed out hereinabove, our filter is especially adapted for use in solid microcircuits. As has also been pointed out hereinabove, in order to provide a filter in the mid or low frequency ranges, it is necessary that either the resistors or the capacitors, or both, have relatively large values requiring areas of inordinate size in a circuit ship. In order to avoid this problem, we use relatively small or moderate sized capacitors 16 and 28 and supply bias current to the diodes 18, 20, 24 and 26 to cause them to act as resistive elements having relatively high values of resistance. It will readily be appreciated that we can form the necessary diodes in a circuit chip without requiring an inordinate amount of space.

Figure 2:
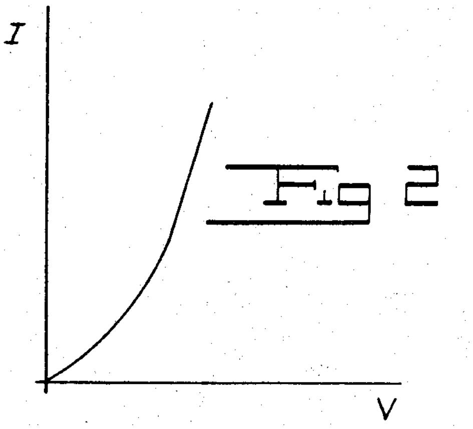
FIG. 2 is a curve illustrating the voltage current relationship of certain elements of our tunable bandpass active filter.
Figure 3:
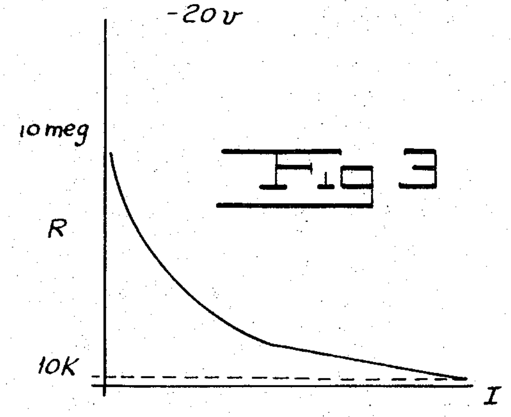
FIG. 3 is a curve illustrating the resistance characteristic of certain elements of our tunable bandpass active filter.

Our bias current supply, indicated generally by the reference character 30, includes a voltage dividing arrangement of a Zener diode 32 and a resistor 34 connected between the terminal 36 of a suitable source of positive potential and ground. In one embodiment of our filter, by way of example, diode 32 may provide a voltage drop thereacross of 10 volts. We connect an adjustable resistor 38 and a transistor 40 in series between terminal 36 and the common terminal of diode 26 and capacitor 28. It will readily be appreciated that, owing to the presence of the Zener diode 32, the current through transistor 40 will be determined by the value of resistor 38. Moreover, there is provided a series current path from the transistor 40 through diodes 26, 24, 18 and 20 to ground. Thus, the setting of resistor 38 determines the current through the diodes and consequently the effective resistance provided by the two diode strings in the respective filter sections 14 and 22. This resistance can readily be seen from FIGS. 2 and 3, the first of which is a schematic representation of the voltage current characteristic of one of the diodes. FIG. 3, which is derived from FIG. 2, illustrates the resistance versus bias current characteristic of the diodes. By way of example, we have shown a characteristic wherein the diode has a very high resistance of the order of 10 megohms, for example, at low bias current values and a relatively much lower resistance value of the order of 10 K. at large bias current values. Resistor 38 is set to supply such a bias current as will provide diode resistances required for the desired center frequency.

We have discovered that our filter is suitable for use over a spectrum of frequencies from less than one cycle per second to more than one hundred megacycles per second. Once resistor 38 has been set, the circuit 30 acts as a constant current source.

Figures 4, 5:
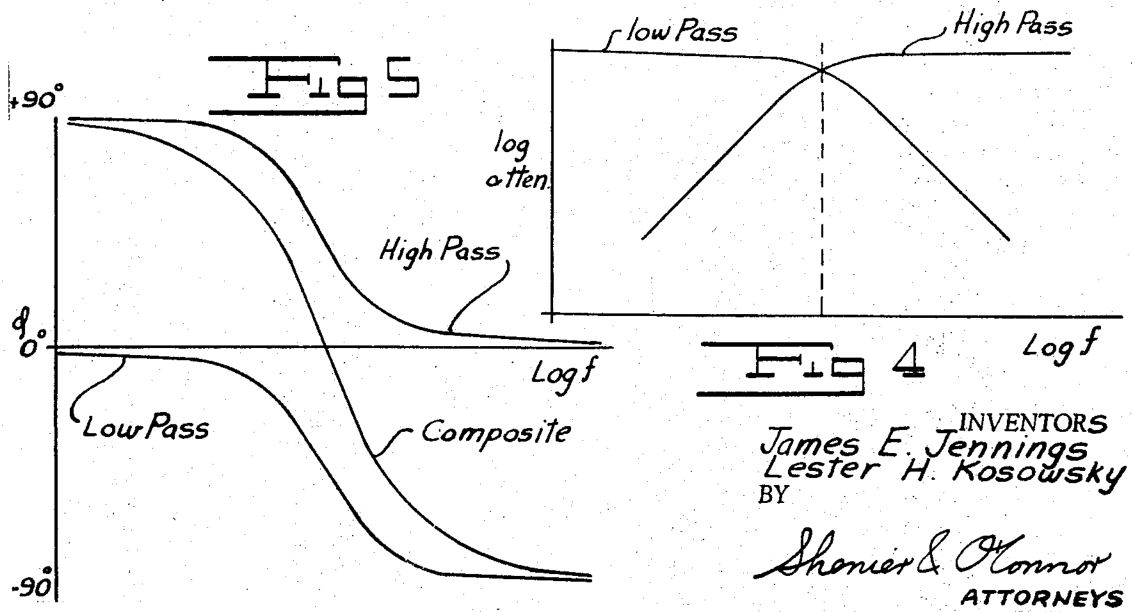
FIG. 4 is a diagram of curves illustrating the attenuation characteristics of portions of our tunable bandpass active filter.
FIG. 5 is a diagram illustrating the phase shift characteristics of portions of our tunable bandpass active filter.

In FIG. 5 we have shown the phase shift characteristics of the high-pass filter section 14, of the low-pass filter section 22 and the composite characteristic resulting from both filter sections.

We apply the output of the section 22 to a stable positive gain amplifier circuit indicated generally by the reference character 42, including a first transistor 44 connected between terminal 36 and a common emitter resistor 46 which, in turn, is connected to a terminal 48 of a suitable source of negative potential having a magnitude of, for example, −20 volts. Amplifier 42 includes a second transistor 50 connected between a collector resistor 52 and the common emitter resistor 46. We connect voltage-dividing resistors 54 and 56 between the base of transistor 50 and terminal 48. A variable resistor 58 connected between the base of transistor 50 and ground permits the gain of the amplifier to be varied. We connect a Zener diode 60 providing a voltage drop of 10 volts between the common terminal of resistors 54 and 56 and the collector of transistor 50.

With the circuit parameters shown in FIG. 2 being used, by way of example, each of the transistors 44 and 50 draws a current of about one milliampere and the potentials at the emitters and bases are substantially at ground. In response to a rise in potential at the base of transistor 44 relative to the base of transistor 50, transistor 44 draws more current to produce an increase in the voltage drop across resistor 46 to result in a rise in potential at the collector of transistor 50 and a consequent rise in potential at the common terminal of resistor 54. The circuit then operates to raise the potential of the base of transistor 50 to the potential of the base of transistor 44 to provide a signal at the common terminal of resistors 54 and 56, which is the gain of the amplifier times the rise in potential at base 44. By way of example, we may provide the amplifier 42 with a +4 gain. This gain may be varied by changing the resistance of resistor 58.

A variable resistor 62 connected between the common terminal of resistors 54 and 56 and the input of filter section 14 provides a regenerative feedback for the circuit. If the frequency of the input signal is the same as that to which our filter is tuned, the feedback signal will be in phase with the input signal and will reinforce it. At all other frequencies, the feedback signal will be out of phase with the input signal and will not reinforce it to the same extent. We have shown the phase shift provided by the filter section 14, by the filter section 22 and by the overall filter in FIG. 5. It will readily be apparent that the greater the feedback, the more sharply tuned will be the response of our circuit. Care must be taken not to increase the feedback excessively or the network will become unstable.

In operation of our tunable bandpass active filter we set resistor 38 to provide a biasing current through the strings of diodes 24 and 26 and 18 and 20 as to tune the circuit to the desired frequency. It will readily be apparent that as we increase the biasing current we reduce the effective resistance of the diodes, thus to increase the frequency to which our filter is tuned. Conversely, as we decrease the biasing current the effective resistance increases to tune the circuit to a relatively lower frequency.

The signal from the filter section 22 is amplified by the differential amplifier arrangement 42 to provide a positive feedback signal to the imput filter section 14. We may increase the feedback signal either by varying resistor 58 or by varying resistor 62. The greater the feedback signal, the sharper will be the tuning of the circuit. If the input signal at terminal 12 is of the same frequency as that to which the circuit is tuned, it will be reinforced by the feedback signal. If, on the other hand, the input signal is not of a frequency to which the circuit is tuned, then the feedback signal will not reinforce it to as great an extent.

As has been explained hereinabove, we are able to form the diodes 18, 20, 24 and 26 in a solid microcircuit and to supply them with a biasing current which will give us a very high effective resistance without requiring an inordinate amount of space such as would be necessary if an attempt were made to form the resistors in the manner known in the art.

It will be seen that we have accomplished the objects of our invention. We have provided a tunable bandpass active filter which overcomes the defects of filters of the prior art. Our circuit is especially adapted for use in solid microcircuits to provide filters tuned to a frequency in the medium or low frequency range. We may readily adjust both the frequency to which our circuit is tuned and the selectivity of the circuit. It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A filter system including in combination an input terminal, an output terminal, a series reactive element, a shunt reactive element, a series diode, a shunt diode, means comprising said elements and said diodes forming a filter between said input terminal and said output terminal, said means providing a direct current path through said series and shunt diodes, means for supplying a biasing current for said diodes, and means providing a regenerative feedback signal from said output terminal to said input terminal.

2. A filter system as in claim 1 including means for varying said biasing current.

3. A filter system as in claim 1 including means for varying said feedback signal.

4. A filter system as in claim 1 including means for varying said biasing current and means for varying said feedback signal.

5. A filter system as in claim 1 in which said feedback signal providing means comprises a stabilized amplifier and means for varying the gain of said amplifier.

6. A bandpass filter assembly including in combination a first L filter section comprising a fixed series capacitance and a shunt resistance including a diode, a second L filter section comprising a series resistance including a diode and a fixed shunt capacitance, means connecting said filter sections in series, means providing a variable direct current bias for said diodes and means for varying said bias current to vary the incremental resistance of said diodes to change the frequency characteristic of said assembly.

7. A filter assembly as in claim 6 in which said connecting means provides a common direct current path for said diodes.

8. A filter assembly including in combination a low pass filter section comprising a series resistance and a fixed shunt capacitance, a high pass filter section comprising a fixed series capacitance and shunt resistance, each of said resistances comprising a diode, means providing a variable direct current bias for said diodes, means for varying said bias current to vary the incremental resistance of said diodes to change the frequency characteristic of said assembly, means connecting said filter sections in series, an amplifier, and means including said filter sections for providing a regenerative feedback for said amplifier.

9. A filter assembly as in claim 8 including means for varying said feedback signal.

10. A filter assembly as in claim 8 including means for varying said bias.

References Cited

UNITED STATES PATENTS

| | | | |
|---|---|---|---|
| 3,296,546 | 1/1967 | Schneider | 333—70 |
| 3,356,865 | 12/1967 | Woster | 307—295 |
| 3,070,762 | 12/1962 | Evans. | |
| 3,206,619 | 9/1965 | Lin. | |
| 2,106,793 | 2/1938 | Burton | 328—167 |
| 2,732,528 | 1/1956 | Anderson | 333—70 |
| 2,816,228 | 12/1957 | Johnson | 333—70 |
| 3,257,631 | 6/1966 | Evans | 333—70 |
| 3,289,102 | 11/1966 | Hayashi | 307—295 |
| 3,290,624 | 12/1966 | Hines | 307—295 |

OTHER REFERENCES

Radio-Electronics Engineering, October 1951, pp. 3-6 and 24.

DONALD D. FORRER, Primary Examiner

H. A. DIXON, Assistant Examiner

U.S. Cl. X.R.

307—233, 317; 328—167; 333—70